United States Patent
Zhang et al.

(10) Patent No.: US 12,417,870 B1
(45) Date of Patent: Sep. 16, 2025

(54) METHOD AND DEVICE FOR DRIVING MOVEMENT OF TARGET OBJECT BY GRAVITATIONAL FIELD GENERATED BY VARYING ELECTROMAGNETIC FIELD

(71) Applicant: Zhang Xiang Qian Technologies Inc., Sheriden, WY (US)

(72) Inventors: Xiangqian Zhang, Chaohu (CN); Zhongqiang Xiao, Nanjing (CN); Xiang Li, Lianyungang (CN)

(73) Assignee: Zhang Xiang Qian Technologies Inc., Sheriden, WY (US)

( * ) Notice: Subject to any disclaimer, the term of this patent is extended or adjusted under 35 U.S.C. 154(b) by 0 days.

(21) Appl. No.: 19/087,481

(22) Filed: Mar. 22, 2025

(30) Foreign Application Priority Data

Jan. 21, 2025 (CN) .......................... 202510096105.X

(51) Int. Cl.
  *H01F 7/20* (2006.01)
  *B64G 1/40* (2006.01)
  *H01F 27/28* (2006.01)

(52) U.S. Cl.
  CPC ............ *H01F 7/202* (2013.01); *B64G 1/409* (2013.01); *B64G 1/417* (2023.08); *H01F 27/2823* (2013.01)

(58) Field of Classification Search
  CPC ..... H01F 5/00; H01F 7/06; H01F 7/20; H01F 7/202; H01F 27/2823; B64G 1/409; B64G 1/417
  See application file for complete search history.

(56) References Cited

U.S. PATENT DOCUMENTS

| | | | | |
|---|---|---|---|---|
| 6,098,924 A | * | 8/2000 | Woodward | ............ B64G 1/417 244/62 |
| 6,347,766 B1 | * | 2/2002 | Woodward | ............ H04R 23/00 244/62 |

(Continued)

OTHER PUBLICATIONS

R. Uswarman "Control of a magnetic levitation system using feedback linearization," 2013 International Conference on Computer, Control, Informatics and Its Applications. Retrieved from the Internet: < https://ieeexplore.ieee.org/stamp/stamp.jsp?tp=&arnumber=6819156> (Year: 2013).*

(Continued)

*Primary Examiner* — Danny Nguyen
*Assistant Examiner* — Nicolas Bellido
(74) *Attorney, Agent, or Firm* — Hemisphere Law, PLLC; Zhigang Ma

(57) ABSTRACT

Provided are a method and device for driving movement of a target object by a gravitational field generated by a varying electromagnetic field which relate to the technical field of physics. The method includes: generating, by a variable electromagnetic field generator, a time-varying electromagnetic field in space where a target is located; adjusting a frequency, amplitude and phase of the time-varying electromagnetic field so as to generate an effect of a varying magnetic field in the space; and based on the time-varying electromagnetic field, generating an acting force on the target object to drive the target object to move along a predetermined trajectory or direction. The present invention breaks through limitation that the traditional electromagnetic mechanics can only drive metal materials, utilizes the varying characteristics of the electromagnetic field to drive and realize accurate control of movement of all objects comprising a non-magnetic substance and a non-conductive substance.

10 Claims, 3 Drawing Sheets

(56) References Cited

U.S. PATENT DOCUMENTS

2012/0092107 A1* 4/2012 Baptista De Alves Martins ......... F03H 99/00 335/306
2019/0295756 A1* 9/2019 Zhang ..................... H01F 7/06

OTHER PUBLICATIONS

R. Uswarman "Modified sliding mode control with uncertainties behavior of a magnetic levitation system," 2013 International Conference on Robotics, Biomimetics, Intelligent Computational Systems. Retrieved from the Internet: <https://ieeexplore.ieee.org/stamp/stamp.jsp?tp=&arnumber=6743603> (Year: 2013).*

Steven M. Kaplan, "G," in Wiley Electrical and Electronics Engineering Dictionary, IEEE, 2004, pp. 308-327, doi: 10.1109/9780470547151.ch7. Retrieved from the Internet: <https://ieeexplore.ieee.org/xpl/ebooks/bookPdfWithBanner.jsp?fileName=5273109.pdf&bkn=5273107&pdfType=chapter> (Year: 2004).*

* cited by examiner

METHOD AND DEVICE FOR DRIVING MOVEMENT OF TARGET OBJECT BY GRAVITATIONAL FIELD GENERATED BY VARYING ELECTROMAGNETIC FIELD

FIELD OF TECHNOLOGY

The present invention relates to the technical field of physics, in particular to a method and device for driving movement of a target object by a gravitational field generated by a varying electromagnetic field.

BACKGROUND

At present, most of traditional substance drive devices rely on common mechanical principles such as a direct mechanical force and an electromagnetic force. For example, a motor drives a rotor to do mechanical movement through a magnetic field generated by a current, and an electromagnetic levitation technology utilizes magnetic field interaction to achieve levitation or driving of an object. However, limitations of these technologies are that they can only target specific types of materials or substance and rely on traditional sources of electricity or gravity. Under a current scientific framework, magnetic and gravitational fields are fundamentally different, and an effect of an electromagnetic force on a substance is usually independent of gravity, so it is quite difficult to utilize traditional electromagnetic technologies to simulate the gravitational field and drive movement of various objects.

SUMMARY

In view of this, a purpose of the present invention is to provide a method and device for driving movement of a target object by a gravitational field generated by a varying electromagnetic field. It aims to utilize varying characteristics of the electromagnetic field to simulate an acting force similar to a gravitational field, and produce an effect similar to the gravitational field through the varying electromagnetic field, so as to drive movement of all objects comprising a non-magnetic substance and a non-conductive substance, realize accurate control of the movement of substances, and break through a limitation that traditional electromagnetic mechanics can only drive metal materials. It does not rely on a conventional electromagnetic force or a mechanical driving force. By adjusting changes in the electromagnetic field to produce a gravity-like effect, the movement of all substances, comprising the non-magnetic substance and the non-conductive substance, are driven.

To realize the above purpose, the present invention provides the following technical schemes:

Based on the above purpose, in a first aspect, provided in the present invention is a method for driving movement of a target object by a gravitational field generated by a varying electromagnetic field, wherein the method comprises the following steps:
  generating, by a variable electromagnetic field generator, a time-varying electromagnetic field in space where a target is located;
  adjusting a frequency, amplitude and phase of the time-varying electromagnetic field so as to generate an effect of a varying magnetic field in the space; and
  based on the time-varying electromagnetic field, generating an acting force on the target object to drive the target object to move along a predetermined trajectory or direction.

As a further scheme of the present invention, the variable electromagnetic field generator comprises a high-voltage direct current power supply, a frequency converter and an electromagnetic coil, wherein the power supply provides an adjustable current for the electromagnetic coil, and the frequency converter is used to adjust a frequency and waveform of the current to generate a varying electromagnetic field.

As a further scheme of the present invention, the time-varying electromagnetic field is an electromagnetic field generated by a varying pulsed direct current.

As a further scheme of the present invention, the target object is any material substance comprising a magnetic substance, a non-magnetic substance or a non-conductive substance.

As a further scheme of the present invention, frequency, amplitude and phase parameters of the electromagnetic field are controlled to adjust the acting force of the electromagnetic field on the target object when the time-varying electromagnetic field generates the acting force on the target object and drives the target object to move along a predetermined trajectory or direction, so that the change of the electromagnetic field produces an effect similar to the gravitational field, which affects a position of the target object in the space and drives a substance to move along the predetermined trajectory.

As a further scheme of the present invention, the method for driving movement of a target object by a gravitational field generated by a varying electromagnetic field further comprises: monitoring a movement state of the target object through a feedback system in real-time, and adjusting and controlling the varying characteristics of the electromagnetic field according to a feedback.

As a further scheme of the present invention, the feedback system comprises a position sensor, a speed sensor and an acceleration sensor, which are configured to monitor a movement state of a position, speed and acceleration of the target object in real-time.

In a second aspect, also provided in the present invention is a device for driving movement of a target object by a gravitational field effect generated by a varying electromagnetic field, wherein the device comprises:
  a variable electromagnetic field generator, which is configured to generate a time-varying electromagnetic field, wherein the variable electromagnetic field generator comprises a high-voltage direct current power supply, a frequency converter and an electromagnetic coil;
  a control unit, which is configured to adjust a working state of the variable electromagnetic field generator and control a frequency, amplitude and phase of the electromagnetic field;
  a substance support platform, which is configured to support and locate the target object, wherein the platform can adjust a relative position of the target object; and
  a feedback system, which is configured to monitor a movement state of the target object in real-time, and adjust a parameter of the electromagnetic field according to monitored data.

As a further scheme of the present invention, the feedback system comprises a position sensor, a speed sensor and an acceleration sensor, which are configured to monitor a movement state of the target object in real-time.

As a further scheme of the present invention, the variable electromagnetic field generator can generate a variable pulsed direct current.

As a further scheme of the present invention, the control unit adjusts the electromagnetic field parameter through a real-time data processing algorithm to ensure that the target object moves according to a predetermined trajectory.

As a further scheme of the present invention, the substance support platform can be configured with different support forms to adapt to movement requirements of different types of substances.

As a further scheme of the present invention, the variable electromagnetic field generator comprises:
- a vacuum tank, in which a small ball is suspended with a fine cotton thread, wherein the small ball is made of any material substance and is capable of rotating in a vacuum environment;
- two coils arranged on upper and lower sides of the vacuum tank, wherein an upper coil is connected to a high-voltage direct current pulsed power supply, and a lower coil is grounded,
- wherein the coils are wound by a silicone wire, and the wire of each coil is a copper wire, and wires between the coils are disconnected and staggered in space.

As a further scheme of the present invention, the diameter of the silicone wire of the coils is 10 mm, the diameter of the copper wire in the center of the silicone wire is 1.5 mm, and a break point between the two coils is not insulated treatment, forming an open break point.

As a further scheme of the present invention, the vacuum tank has a diameter of 10 cm, and the coil above it is connected with an output end of a high-voltage direct current generator, a voltage range is about 50,000 volts, and the current is one hundred thousandth of an ampere.

As a further scheme of the present invention, the small ball is suspended with the fine cotton thread, which is fixed at one end inside the vacuum tank for free rotation under action of the electromagnetic field.

As a further scheme of the present invention, the high-voltage direct current generator is of a 2GF-200 KV/5 mA model, which can adjust an output voltage and a current to control a rotation speed of the small ball.

As a further scheme of the present invention, an internal pressure of the vacuum tank is adjusted to a near-vacuum state to avoid interference of an electrostatic motor effect and an ionic wind effect on the movement of the substances; the variable electromagnetic field generator can produce a gravity-like effect in the vacuum environment, so as to drive the rotation or movement of the small ball of all substances, comprising the non-magnetic substance (such as polyethylene or plastic); through the time-varying electromagnetic field generated by driving of the high-voltage direct current power supply, the rotation trajectory and speed of the small ball can be accurately controlled, which is suitable for the fields of a micro-robot, a precision instrument and substance control.

Provided in the present invention is a method and device for driving movement for simulating a gravitational field effect and driving movement of a substance by a varying electromagnetic field. By precisely controlling the changes in the electromagnetic field, it can drive various types of substances, especially the non-magnetic substance and the non-conductive substance, which overcomes a limitation of existing electromagnetic force applications. The present invention has wide application potential in a plurality of fields, comprising a micro-nano technology, medical treatment, aerospace, industrial automation, etc., and provides a new substance manipulation technology.

Compared with the prior art, the method and device method for driving movement of a target object by a gravitational field generated by a varying electromagnetic field provided in the present invention have the following beneficial effects:

1. Since the traditional electromagnetic field mainly acts on substances with magnetic or conductive characteristics, the present invention breaks through the limitation of a traditional electromagnetic force, and can produce the gravity-like effect by adjusting the time-varying characteristics of the electromagnetic field, which overcomes the limitation that electromagnetic can only drive magnetic substances and conductive substances, so that the non-magnetic and non-conductive substances can also move under the action of the electromagnetic field. This innovation broadens a range of applications of an electromagnetic force drive technology.

2. The electromagnetic device of the present invention can produce the gravity-like effect, and can drive substances of all the materials, which is not only suitable for the magnetic substances, but also can drive the movement of the non-magnetic substances, the non-conductive substances and even liquids, gases and other substances, and can also operate on the interior of the substances. This feature makes the technology potentially useful in many areas where a traditional electromagnetic technology cannot be applied, such as application in a micro-nano technology, precise manipulation of non-magnetic materials, and certain biomedical fields.

3. By precisely adjusting the frequency, amplitude, phase and other parameters of the electromagnetic field, the present invention can realize the high-precision control of the movement of substances, and a real-time feedback of the control system and the dynamic adjustment of the electromagnetic field parameters make the movement state of the substances accurately adjusted to achieve a required speed, trajectory and direction. The high precision control characteristics of the technology provide a more reliable solution for industrial automation, material handling, micro-robotics and other fields.

4. The time-varying electromagnetic field device can generate or simulate the gravitational effect by adjusting its characteristics, and has high energy conversion efficiency when driving the substances. Compared with a traditional electromagnetic drive mode, the present invention can achieve a stronger substance drive effect under lower power consumption, have a higher energy utilization rate, and be easier to be controlled by human beings, especially easy to be controlled by computer programs. The technology of the present invention can be applied to a number of fields, comprising but not limited to:

Micro-nano technology: in manipulation of micro-objects or nano-scale substances, extremely accurate substance positioning and driving can be achieved, providing new ideas for development of micro-robots, sensors and other micro-nano devices.

Biomedical field: it can precisely manipulate drugs, particles and other substances in living organisms, promoting the progress of targeted drug delivery and minimally invasive surgery and other technologies.

Aerospace: through the precise substance drive technology, precise positioning and regulation of substances in a spacecraft or device can be achieved, which has great space exploration and research application value.

Industrial automation: the present invention can be used for non-contact object handling, material delivery and precision control of automatic production lines, so as to improve the production efficiency and reliability.

The present invention allows realization of movement control requirements under different substances and different environments through real-time adjustment of electromagnetic fields, and has a high degree of flexibility. Whether it is for different shapes of substances, or the needs of different working environments, it can ensure the controllability and accuracy of substance movement by adjusting the parameters of the electromagnetic field.

5. The present invention realizes the substance drive through the electromagnetic field, and there is no need for direct contact among the substances, avoiding wear, heat loss and other problems caused by friction in the traditional mechanical drive. The contactless drive reduces friction and loss, which not only improves the efficiency of the system, but also extends the service life of the device.

In summary, the present invention generates or simulates the gravitational effect through the time-varying characteristics of the electromagnetic field, breaks through the limitation of the traditional electromagnetic force drive technology, and can not only drive various types of substances, but also realize high-precision and flexible substance movement control. The application potential of this technology is huge, and it can be widely used in the micro-nano technology, biomedicine, aerospace, industrial automation and other fields, with significant technical advantages and economic value.

These and other aspects of this application are more easily understood in the description of the following embodiments. It should be understood that the general description above and the detailed description below are illustrative and explanatory only and do not limit this application.

BRIEF DESCRIPTION OF THE DRAWINGS

In order to more clearly state the technical schemes in the embodiments of the present invention or related technologies, a brief introduction is made below to accompanying drawings required to be used in the description of exemplary embodiments or related technologies. The drawings are used to provide further understanding of the present invention, form part of the specification, are used to explain the present invention together with the embodiments of the present invention, and do not constitute a limitation of the present invention. In the figures.

DESCRIPTION OF THE EMBODIMENTS

Figure 1:
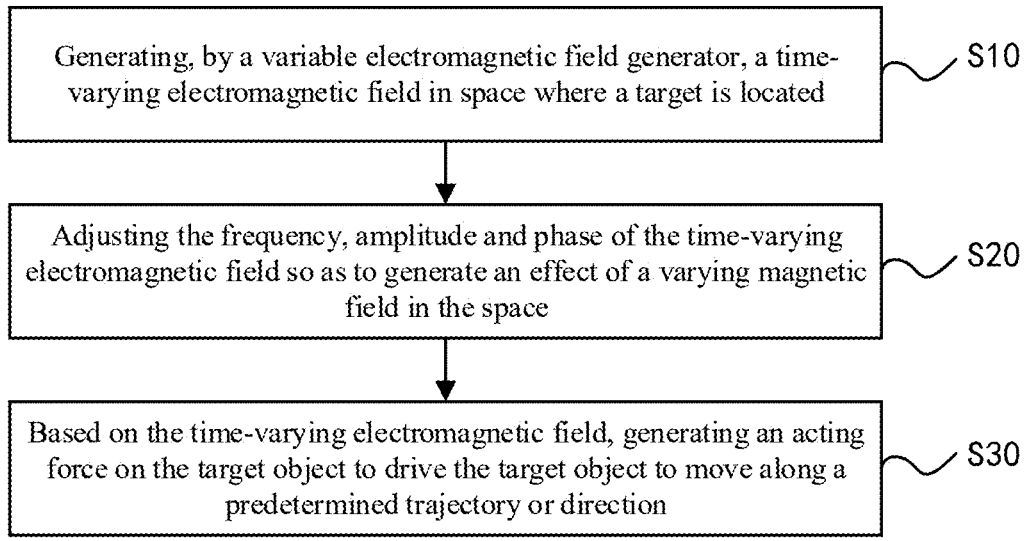
FIG. 1 is a flow chart of a method for driving movement of a target object by a gravitational field generated by a varying electromagnetic field in an embodiment of the present invention.

The following is a further description of this application in combination with the attached drawings and specific embodiments. It should be noted that, without conflict, new embodiments can be formed arbitrarily among the embodiments or technical features described below.

In order to make the purpose, technical schemes and advantages of the present invention more clear, the embodiments of the present invention are further detailed in the following in combination with specific embodiments and with reference to the attached drawings. It should be understood that the specific embodiments described herein are intended only to interpret this application and are not intended to qualify it.

It should be noted that all the expressions using "first" and "second" in the embodiments of the present invention are to distinguish two non-identical entities with the same name or non-identical parameters, so the "first" and "second" are for the convenience of expression only and should not be understood as a limitation of the embodiments of the present invention. In addition, the terms "comprising" and "having" and any variation thereof are intended to cover non-exclusive inclusions, such as other steps or units inherent in a process, method, system, product, or device comprising a series of steps or units.

The following is a clear and complete description of the technical schemes in the embodiments of this application in combination with the drawings attached to the embodiments of this application. Obviously, the embodiments described are part of the embodiments of this application, but not all embodiments. Based on the embodiments in this application, all other embodiments obtained by persons of ordinary skill in the art without creative labor are within the protection scope of this application.

Flowcharts shown in the attached drawings are illustrative only and do not have to comprise all contents and operations/steps, nor does it have to be performed in an order described. For example, some operations/steps can also be broken down, combined, or partially combined, so that an actual order of execution may change depending on an actual situation.

Some embodiments of this application are described in detail below in conjunction with the attached drawings. Where there is no conflict, the following embodiments and the features in the embodiments may be combined with each other.

As most of traditional substance drive devices rely on common mechanical principles such as a direct mechanical force and an electromagnetic force, under a current scientific framework, magnetic and gravitational fields are fundamentally different, and an effect of an electromagnetic force on a substance is usually independent of gravity, so it is quite difficult to utilize traditional electromagnetic technologies to simulate the gravitational field and drive movement of various objects. In view of this, the present invention proposes a method and device for driving movement of a target object by a gravitational field generated by a varying electromagnetic field. It aims to utilize varying characteristics of the electromagnetic field to simulate an acting force similar to a gravitational field, and produce an effect similar to the gravitational field through the varying electromagnetic field, so as to drive movement of all objects comprising a non-magnetic substance and a non-conductive substance, realize accurate control of the movement of substances, and break through a limitation that traditional electromagnetic mechanics can only drive metal materials. It does not rely on a conventional electromagnetic force or a mechanical driving force. By adjusting changes in the electromagnetic field to produce a gravity-like effect, the movement of all substances, comprising the non-magnetic substance and the non-conductive substance, are driven.

As shown FIG. 1, a method for driving movement of a target object by a gravitational field generated by a varying electromagnetic field is provided in an embodiment of the present invention, wherein the method comprises the following steps:

S10: generating, by a variable electromagnetic field generator, a time-varying electromagnetic field in space where a target is located.

In this step, the variable electromagnetic field generator comprises a high-voltage direct current power supply, a frequency converter and an electromagnetic coil, wherein the power supply provides an adjustable current for the electromagnetic coil, and the frequency converter is used to adjust a frequency and waveform of the current to generate a varying electromagnetic field.

In this embodiment, the variable electromagnetic field generator works with the high-voltage direct current power supply, the frequency converter and the electromagnetic coil to generate the varying electromagnetic field. A specific process is as follows:

(1) The high-voltage direct current power supply: providing a current and generating a basic electromagnetic field through an electromagnetic coil. A current value of the direct current power supply can be adjusted to allow the strength of the electromagnetic field to change at any time.

(2) The frequency converter: generating the time-varying electromagnetic field by adjusting a frequency and waveform of the current (such as a sine wave, a square wave, a pulse wave). Frequency regulation makes the electromagnetic field change periodically, resulting in a dynamic magnetic field effect.

(3) The electromagnetic coil: generating the time-varying electromagnetic field through the current provided by the high-voltage direct current power supply. The frequency and waveform of the current affect a way that the magnetic field changes (e.g., changing in a frequency, an amplitude, a phase).

The type of time-varying electromagnetic field: the time-varying electromagnetic field can be an alternating current electromagnetic field (AC), that is, a current direction and intensity change periodically; a pulsed electromagnetic field, in which a current quickly switched on and off; or an adjustable electromagnetic field, in which the current changes with time, and can produce different forms of electromagnetic fields as needed.

Step S20: adjusting a frequency, amplitude and phase of the time-varying electromagnetic field so as to generate an effect of a varying magnetic field in the space.

In this step, the magnetic field effect is further optimized by controlling the parameters of the time-varying electromagnetic field, resulting in a specific acting force on the target object. This step comprises:

1. Adjusting the frequency: changing a period of variation of the magnetic field by adjusting a frequency of the current. A high frequency electromagnetic field produces a rapidly varying magnetic field, while a low frequency produces a slower magnetic field change. This adjustment helps to accurately control a trajectory and speed of the target object.

2. Adjustment amplitude: by changing the amplitude of the current (that is, the strength of the current), the strength of the magnetic field can be adjusted, which affects the size of the acting force. A stronger magnetic field generates a larger driving force, which is suitable for scenarios that require stronger thrust; and a weaker magnetic field generates less thrust and is suitable for precision control.

3. Adjusting the phase: by changing the phase of the electromagnetic field, directional control of different target objects can be achieved. Through the control of the phase, the acting force of the magnetic field can be directed or adjusted to more precisely guide the substance to move in a particular direction or trajectory.

S30: based on the time-varying electromagnetic field, generating an acting force on the target object to drive the target object to move along a predetermined trajectory or direction.

In this step, the target object is any material substance comprising a magnetic substance, a non-magnetic substance or a non-conductive substance. For the magnetic substances, the change of time-varying electromagnetic field stimulates an interaction acting force of substances in the magnetic field and drive the substance to move. For example, an object made with a permanent magnet or soft magnetic material generates a strong driving force in the varying magnetic field. For the non-magnetic substances (such as plastic, glass or wood), a change of the time-varying electromagnetic field can still produce an acting force on the object, and this effect comes from a change effect of the electromagnetic field. In particular, under a rapid change of a pulsed direct current, the non-magnetic substance can also be pushed by the force to achieve directional movement.

For the non-conductive substances (such as ceramics or rubber), although these substances themselves do not conduct electricity and do not have magnetic properties, they can still be affected by acting forces in the varying electromagnetic field. For example, a principle of electromagnetic induction is utilized, or an electric field with a polarization effect is set up with the magnetic field, so that the non-conductive substance can feel a driving effect of the electromagnetic field.

In this embodiment, the frequency, amplitude and phase parameters of the electromagnetic field are controlled to adjust the acting force of the electromagnetic field on the target object when the time-varying electromagnetic field generates the acting force on the target object to drive the target object to move along a predetermined trajectory or direction, so that the change of the electromagnetic field produces an effect similar to the gravitational field, which affects the position of the target object in the space and drives a substance to move along the predetermined trajectory.

In the method for driving movement of a target object by a gravitational field generated by a varying electromagnetic field in the present invention, by driving the movement of the target object through the varying electromagnetic field (time-varying electromagnetic field), the gravitational field effect is simulated in principle, so that the target object (no matter whether it is the magnetic, non-magnetic or non-conductive substance) moves along a predetermined trajectory or direction in the space.

This method has wide application potential, especially in the manipulation of small objects, precision instrument control, contactless drive and substance control in special environments.

In some embodiments, the method for driving movement of a target object by a gravitational field generated by a varying electromagnetic field further comprises:

monitoring a movement state of the target object through a feedback system in real-time, and adjusting and controlling the varying characteristics of the electromagnetic field according to a feedback.

In this embodiment, the feedback system can monitor a movement state (location, speed, acceleration) of the target object in real-time, and adjust the varying characteristics of the electromagnetic field automatically according to monitored data so as to achieve more accurate movement control. The feedback control system ensures that the target object moves along a predetermined trajectory or direction, and can effectively cope with changes in the environment or fluctuations in the substance state, and has a wide application potential, especially in the fields of precision control and micro-nano operation.

In this feedback system, the feedback system comprises a position sensor, a speed sensor and an acceleration sensor, which are configured to monitor a movement state of a position, speed and acceleration of the target object in real-time. A detailed procedure is as follows:

The position sensor: detecting changes in a position of the target object in real-time. With the position data, the system can accurately understand whether the target object is on a predetermined trajectory and calculate the amount of adjustment required.

The speed sensor: detecting an instantaneous speed of the target object to determine whether its movement state meets an expectation. If the speed of the target object exceeds a predetermined range, the system can adjust the strength or frequency of the electromagnetic field timely to prevent the object from moving too fast or too slow.

The acceleration sensor: detecting the acceleration of the target object to further optimize the smoothness and stability of movement. If the acceleration of the target object is too large or too small, the feedback system can adjust the varying characteristics of the electromagnetic field to avoid violent fluctuations or jitter during the movement of the object.

In this embodiment, the feedback system adjusts the varying characteristics of the electromagnetic field automatically according to monitored real-time data. A specific adjustment method comprises:

Adjusting the frequency of the electromagnetic field: according to the movement state of the target object, change the frequency of the electromagnetic field, so that the movement of the target object is in line with an expected trajectory. For example, if the object moves too fast, the frequency of the electromagnetic field is reduced; and if the object does not move fast enough, the frequency of the electromagnetic field is increased.

Adjusting the amplitude of the electromagnetic field: adjusting the strength of the electromagnetic field according to the acceleration or speed of the target object. If greater thrust is required, the amplitude of the electromagnetic field can be increased. Conversely, the amplitude of the electromagnetic field is reduced to precisely control the speed of the substance.

Adjusting the phase of the electromagnetic field: according to the real-time position and direction of movement of the target object, adjusting the phase of the electromagnetic field, so that the acting force always points in a right direction, thus accurately controlling the movement of the substance.

The method can monitor and adjust the movement state of the object in real-time by driving the movement of the target object through the time-varying electromagnetic field and combining with the feedback control system. By precisely controlling the frequency, amplitude and phase of the electromagnetic field, a directional acting force is generated to drive the target object to move in a specific trajectory or direction.

The position, speed and acceleration sensors monitor the state of the target object in real-time, and adjust the characteristics of the electromagnetic field according to the monitored data to ensure that the target object accurately moves along the predetermined trajectory, avoiding the accumulation of errors and deviation from the trajectory. Due to the ability to manipulate various types of substances, comprising the magnetic, non-magnetic, and non-conductive substances, the method is suitable for a variety of precision control tasks, such as micro-nano object operations, intelligent robot control, unmanned systems and spacecraft trajectory control.

On the basis of the traditional time-varying electromagnetic field control technology, the method of the present invention adds the real-time feedback control system to realize the dynamic adjustment of the target object movement through the feedback of the position, speed and acceleration sensors. This method can not only accurately control the trajectory of the target object, but also operate stably under an uncertain environment. It is widely used in micro-nano substance control, robotics, spacecraft control and other fields, and has great application potential.

It is to be noted that the attached drawings above are only illustrative illustrations of the processing comprised in the methods according to the exemplary embodiments of the present invention and are not for a restrictive purpose. It is easy to understand that the processes shown in the above attached drawings do not indicate or limit a chronological order of these processes. Also, it is easy to understand that these processes can be performed, for example, synchronously or asynchronously across a plurality of modules.

It should be understood that although the above is described in a certain order, the steps do not necessarily follow the above order. Unless explicitly stated herein, there is no strict order in which these steps are performed, and these steps can be performed in other orders. Furthermore, part of the steps in this embodiment may comprise a plurality of steps or stages, which are not necessarily completed at the same time, but may be executed at different times, and the execution order of these steps or stages is not necessarily sequential. Instead, they can be performed alternately or interchangeably with other steps or at least part of steps or phases within other steps.

In a second aspect of the embodiments of the present invention, also provided in the present invention is a device for driving movement of a target object by a gravitational field effect generated by a varying electromagnetic field, wherein the device comprises:

a variable electromagnetic field generator, which is configured to generate a time-varying electromagnetic field, wherein the variable electromagnetic field generator comprises a high-voltage direct current power supply, a frequency converter and an electromagnetic coil;

a control unit, which is configured to adjust a working state of the variable electromagnetic field generator and control a frequency, amplitude and phase of the electromagnetic field;

a substance support platform, which is configured to support and locate the target object, wherein the platform can adjust a relative position of the target object; and a feedback system, which is configured to monitor a movement state of the target object in real-time, and adjust a parameter of the electromagnetic field according to monitored data.

The feedback system comprises a position sensor, a speed sensor and an acceleration sensor, which are configured to monitor a movement state of the target object in real-time. The variable electromagnetic field generator can generate a variable pulsed direct current. The control unit adjusts the electromagnetic field parameter through a real-time data processing algorithm to ensure that the target object moves according to a predetermined trajectory. The substance support platform can be configured with different support forms to adapt to movement requirements of different types of substances.

The present invention breaks through the limitation of a traditional electromagnetic force, and can produce the gravity-like effect by adjusting the time-varying characteristics of the electromagnetic field, which overcomes the limitation that electromagnetic can only drive magnetic substances and conductive substances, so that the non-magnetic and non-conductive substances can also move under the action of the electromagnetic field.

This innovation broadens a range of applications of an electromagnetic force drive technology. The electromagnetic device of the present invention can produce the gravity-like effect, and can drive substances of all the materials, which is not only suitable for the magnetic substances, but also can drive the movement of the non-magnetic substances, the non-conductive substances and even liquids, gases and other substances, and can also operate on the interior of the substances. This feature makes the technology potentially useful in many areas where a traditional electromagnetic technology cannot be applied, such as application in a micro-nano technology, precise manipulation of non-magnetic materials, and certain biomedical fields.

Figure 2:
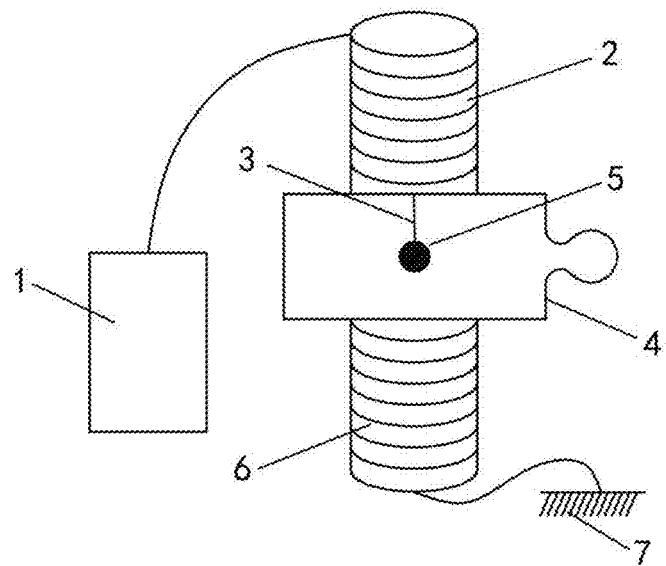
FIG. 2 is a structural diagram of a variable electromagnetic field generator in a method and device for driving movement of a target object by a gravitational field generated by a varying electromagnetic field in an embodiment of the present invention.
Figure 3:
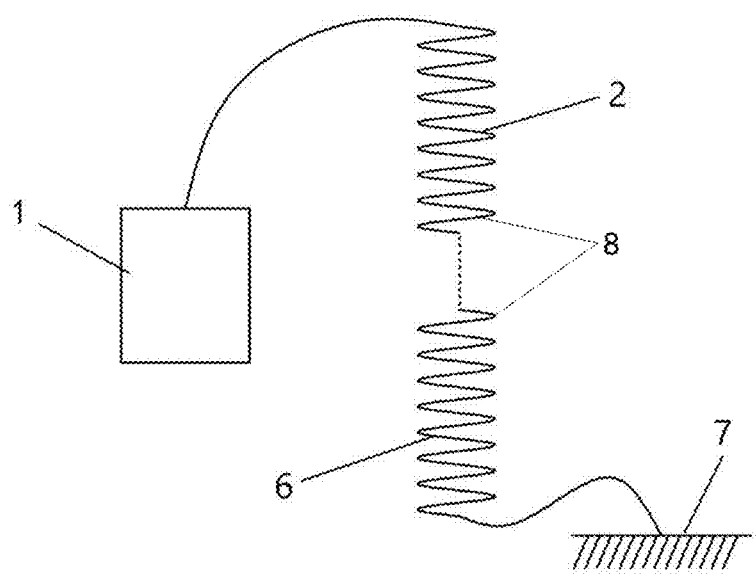
FIG. 3 is a schematic diagram of a structure in which wires between the coils are disconnected and spatially staggered in a method and device for driving movement of a target object by a gravitational field generated by a varying electromagnetic field in an embodiment of the present invention.
Figure 4:
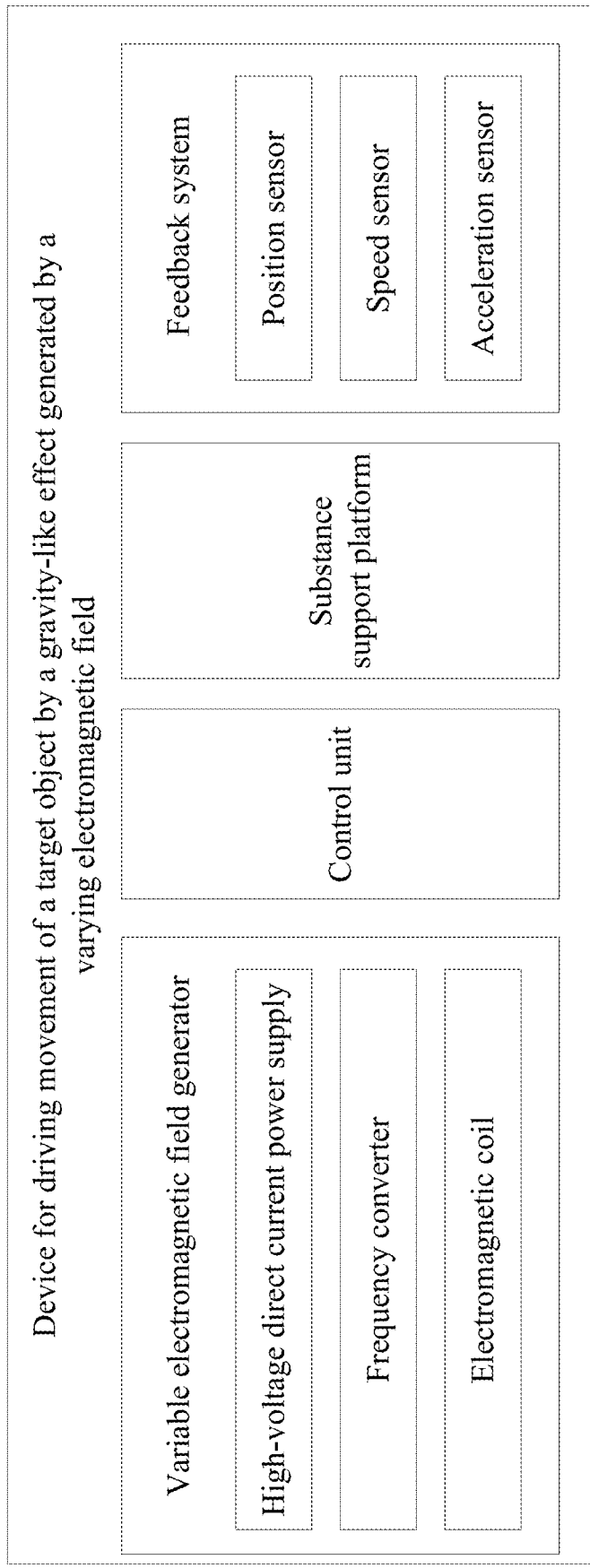
FIG. 4 illustrates a block diagram of a device for driving movement of a target object by a gravity-like effect generated by a varying electromagnetic field in an embodiment of the present invention.

In this embodiment, as shown in FIG. 2 and FIG. 3, the variable electromagnetic field generator comprises:
  a vacuum tank 4, in which a small ball 5 (the target object) is suspended with a fine cotton thread, wherein the small ball 5 is made of a non-magnetic material and can rotate in a vacuum environment;
  two coils arranged on upper and lower sides of the vacuum tank 4, wherein an upper coil 2 is connected to a high-voltage direct current pulsed power supply 1, and a lower coil 6 is grounded and connected to a ground wire 7.

As shown in FIG. 2 and FIG. 3, the coils are wound by a silicone wire 8, and the wire of each coil is a copper wire, and wires between the coils are disconnected and staggered in space.

The diameter of the silicone wire 8 of the coils is 10 mm, the diameter of the copper wire in the center of the silicone wire 8 is 1.5 mm, and a break point between the two coils is not insulated treatment, forming an open break point. The vacuum tank 4 has a diameter of 10 cm, and the coil above it is connected with an output end of a high-voltage direct current generator 1, a voltage range is about 50,000 volts, the current is one hundred thousandth of an ampere, and the high-voltage direct current generator 1 is a 2GF-200 KV/5 mA direct current high-voltage generator.

In this embodiment, the small ball 5 is suspended with the fine cotton thread 3, which is fixed at one end inside the vacuum tank 1 for free rotation under action of the electromagnetic field.

An internal pressure of the vacuum tank 4 is adjusted to a near-vacuum state to avoid interference of an electrostatic motor effect and an ionic wind effect on the movement of the substances; the variable electromagnetic field generator can produce a gravity-like effect in the vacuum environment, so as to drive the rotation or movement of the small ball of all substances, comprising the non-magnetic substance (such as polyethylene or plastic); through the time-varying electromagnetic field generated by driving of the high-voltage direct current power supply 1, the rotation trajectory and speed of the small ball 5 can be accurately controlled, which is suitable for the fields of a micro-robot, a precision instrument and substance control.

Provided in the present invention is a method and device for driving movement for simulating a gravitational field effect and driving movement of a substance by a varying electromagnetic field. By precisely controlling the changes in the electromagnetic field, it can drive various types of substances, especially the non-magnetic substance and the non-conductive substance, which overcomes a limitation of existing electromagnetic force applications. The present invention has wide application potential in a plurality of fields, comprising a micro-nano technology, medical treatment, aerospace, industrial automation, etc., and provides a new substance manipulation technology.

By precisely adjusting the frequency, amplitude, phase and other parameters of the electromagnetic field, the present invention can realize the high-precision control of the movement of substances, and a real-time feedback of the control system and the dynamic adjustment of the electromagnetic field parameters make the movement state of the substances accurately adjusted to achieve a required speed, trajectory and direction. The high precision control characteristics of the technology provide a more reliable solution for industrial automation, material handling, micro-robotics and other fields.

In summary, the present invention generates or simulates the gravitational effect through the time-varying characteristics of the electromagnetic field, breaks through the limitation of the traditional electromagnetic force drive technology, and can not only drive various types of substances, but also realize high-precision and flexible substance movement control. The application potential of this technology is huge, and it can be widely used in the micro-nano technology, biomedicine, aerospace, industrial automation and other fields, with significant technical advantages and economic value.

Through the above detailed steps, the device for driving movement of a target object by a gravitational field effect generated by a varying electromagnetic field in the present invention is used to perform the steps of the method for driving movement of a target object by a gravitational field generated by a varying electromagnetic field in the above embodiments, and it is not repeated herein.

The above are exemplary embodiments disclosed in the present invention, but it should be noted that various changes and modifications may be made without deviating from the scope of disclosure of the embodiments of the present invention limited by the claims. The functions, steps and/or actions of the method claims according to the disclosed embodiments described herein need not be performed in any particular order. In addition, although the elements disclosed in the embodiments of the present invention may be described or required in an individual form, they may also be understood as multiple unless expressly restricted to the singular.

It should be understood that, as used herein, the singular form "one" is intended to comprise the plural form as well, unless the context clearly supports an exception. It should also be understood that the term "and/or" as used herein refers to any and all possible combinations that comprise one or more associated listed items. The serial numbers of the embodiments disclosed in the above embodiments of the present invention are only for description and do not represent the merits of the embodiments.

It should be understood by persons of ordinary skill in the art that the discussion of any of the above embodiments is illustrative only and is not intended to imply that the scope of disclosure (including the claims) of the embodiments of the present invention is limited to such examples; and under the thinking of the embodiments of the present invention, the technical features in the above embodiments or in different embodiments may also be combined, and there are many other variations in different aspects of the embodiments of the present invention as described above, which are not provided in detail for the purpose of brevity. Therefore, any omission, modification, equivalent replacement, improvement, etc. made within the spirit and principles of the embodiments of the present invention shall be included in the protection scope of the embodiments of the present invention.

What is claimed is:

1. A method for driving movement of a target object by a gravity-like effect generated by a varying electromagnetic field, wherein the method comprises the following steps:
   generating, by a variable electromagnetic field generator, a time-varying electromagnetic field in space where the target object is located;
   adjusting a frequency, amplitude and phase of the time-varying electromagnetic field so as to generate an effect of the varying magnetic field in the space; and
   based on the time-varying electromagnetic field, generating an acting force on the target object to drive the target object to move along a predetermined trajectory or direction.

2. The method for driving movement of the target object by the gravity-like effect generated by the varying electromagnetic field according to claim 1, wherein the variable electromagnetic field generator comprises a high-voltage direct current power supply, a frequency converter and an electromagnetic coil, wherein the high-voltage direct current power supply provides an adjustable current for the electromagnetic coil, and the frequency converter is used to adjust a frequency and waveform of the current to generate the varying electromagnetic field.

3. The method for driving movement of the target object by the gravity-like effect generated by the varying electromagnetic field according to claim 2, wherein the time-varying electromagnetic field is an electromagnetic field generated by a varying pulsed direct current.

4. The method for driving movement of the target object by the gravity-like effect generated by the varying electromagnetic field according to claim 1, wherein the target object is any material substance comprising a magnetic substance, a non-magnetic substance or a non-conductive substance.

5. The method for driving movement of the target object by the gravity-like effect generated by the varying electromagnetic field according to claim 1, wherein frequency, amplitude and phase parameters of the time-varying electromagnetic field are controlled to adjust the acting force of the electromagnetic field on the target object when the time-varying electromagnetic field generates the acting force on the target object to drive the target object to move along a predetermined trajectory or direction, so that the change of the electromagnetic field produces an effect similar to the gravitational field, which affects a position of the target object in the space and drives the target object to move along the predetermined trajectory.

6. The method for driving movement of the target object by the gravity-like effect generated by the varying electromagnetic field according to claim 1, wherein the method for driving movement of the target object by the gravity-like effect generated by the varying electromagnetic field further comprises: monitoring a movement state of the target object through a feedback system in real-time, and adjusting and controlling the varying characteristics of the electromagnetic field according to a feedback.

7. The method for driving movement of the target object by the gravity-like effect generated by the varying electromagnetic field according to claim 6, wherein the feedback system comprises a position sensor, a speed sensor and an acceleration sensor, which are configured to monitor a movement state of a position, speed and acceleration of the target object in real-time.

8. A device for driving movement of the target object by the gravity-like effect generated by the varying electromagnetic field, wherein the device is used to carry out the method for driving movement of the target object by the gravity-like effect generated by the varying electromagnetic field according to claim 1, and the device comprises:
   the variable electromagnetic field generator, which is configured to generate the time-varying electromagnetic field, wherein the variable electromagnetic field generator comprises a high-voltage direct current power supply, a frequency converter and an electromagnetic coil;
   a control unit, which is configured to adjust a working state of the variable electromagnetic field generator and control a frequency, amplitude and phase of the electromagnetic field;
   a substance support platform, which is configured to support and locate the target object, wherein the platform can adjust a relative position of the target object; and
   a feedback system, which is configured to monitor a movement state of the target object in real-time, and adjust a parameter of the time-varying electromagnetic field according to monitored data.

9. The device for driving movement of the target object by the gravity-like effect generated by the varying electromagnetic field according to claim 8, wherein the variable electromagnetic field generator comprises:
   a vacuum tank, in which a small ball is suspended with a fine cotton thread, wherein the small ball is made of any material substance and is capable of rotating in a vacuum environment;
   two coils arranged on upper and lower sides of the vacuum tank, wherein an upper coil is connected to the high-voltage direct current pulsed power supply, and a lower coil is grounded,
   wherein the two coils are wound by a silicone wire, and the silicone wire of each coil is a copper wire, and wires between the two coils are disconnected and staggered in space.

10. The device for driving movement of the target object by the gravity-like effect generated by the varying electromagnetic field according to claim 9, wherein the small ball is suspended with the fine cotton thread, which is fixed at one end inside the vacuum tank for free rotation under action of the electromagnetic field.

* * * * *